(12) United States Patent
Hirt et al.

(10) Patent No.: US 6,785,474 B2
(45) Date of Patent: Aug. 31, 2004

(54) METHOD AND APPARATUS FOR SUPPRESSING RELATIVE INTENSITY NOISE (RIN) AND IMPROVING TRANSMISSION SIGNALS

(75) Inventors: Fred S. Hirt, Naperville, IL (US); Michael Keur, Des Plaines, IL (US); Kevin Sweeney, Naperville, IL (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 692 days.

(21) Appl. No.: 09/740,563

(22) Filed: Dec. 19, 2000

(65) Prior Publication Data

US 2004/0120708 A1 Jun. 24, 2004

(51) Int. Cl.[7] ............................................. H04J 14/08
(52) U.S. Cl. ........................ 398/94; 398/53; 398/91
(58) Field of Search ............................. 398/91, 94, 48, 398/172, 53

(56) References Cited

U.S. PATENT DOCUMENTS

| | | | |
|---|---|---|---|
| 5,035,481 A | * 7/1991 | Mollenauer | 398/80 |
| 5,253,309 A | 10/1993 | Nazarathy et al. | |
| 5,278,688 A | 1/1994 | Blauvelt et al. | 359/125 |
| 5,798,858 A | * 8/1998 | Bodeep et al. | 398/194 |
| 5,850,303 A | * 12/1998 | Yamamoto et al. | 398/91 |
| 5,898,496 A | 4/1999 | Huang et al. | |
| 5,912,750 A | * 6/1999 | Takeda et al. | 398/92 |
| 5,940,196 A | 8/1999 | Piehler et al. | |
| 5,946,117 A | * 8/1999 | Meli et al. | 398/80 |
| 5,946,119 A | * 8/1999 | Bergano et al. | 398/91 |
| 5,978,122 A | 11/1999 | Kawazawa et al. | |

FOREIGN PATENT DOCUMENTS

| | | |
|---|---|---|
| EP | 0434004 | 6/1991 |
| JP | 60190039 | 9/1985 |
| WO | WO 99/45612 | 9/1999 |

* cited by examiner

Primary Examiner—Hung N. Ngo

(57) ABSTRACT

A method and apparatus within an optical transmitter (300) for suppressing relative intensity noise (RIN) by generating at least two optical signals (305,310), each having differing wavelengths and combining the optical signals with a combiner (315) into a composite output signal, wherein the composite output signal has an output power value equal to the sum of the power value of the optical signals. The composite output signal is then transmitted over a communication medium, wherein information content of the optical signals are substantially equivalent, and wherein combining the optical signals before transmitting provides a reduction in RIN of the composite output signal compared to the RIN of a single optical signal transmitted over a communication medium.

14 Claims, 7 Drawing Sheets

METHOD AND APPARATUS FOR SUPPRESSING RELATIVE INTENSITY NOISE (RIN) AND IMPROVING TRANSMISSION SIGNALS

FIELD OF THE INVENTION

This invention relates generally to broadband communications systems, such as cable television systems and the optical equipment used in such systems, and more specifically to the transmission of optical signals in a broadband communication system.

BACKGROUND OF THE INVENTION

Communication systems, such as a cable television system, include a headend section for receiving satellite signals and demodulating the signals to baseband. The baseband signal is then converted to an optical signal for transmission from the headend section over fiber optic cable. Optical transmitters are utilized within the cable system for imprinting radio frequency (RF) signal information onto an optical beam, where the optical signal is then split and applied to various optical fibers within the transmitter for transmission to remotely located optical receivers. The optical receivers are provided for receiving the optical signals and converting the optical signals back to RF signals, which are further transmitted along branches of the system over coaxial cable rather than fiber optic cable. Taps are situated along the coaxial cable to tap off a portion of the signal to subscribers of the system.

A primary aim of communication systems is to provide the highest quality signal to each subscriber on the network. It is, therefore, important to understand the parameters that affect network planning and implementation. Prominent among these parameters are amplitudes of the optical signal carriers, i.e., carrier level, and noise. It is well known that noise exists in conventional electrical systems, as well as optical systems, in which noise is further classified as thermal, shot, and relative intensity noise (RIN), the latter being exclusive to optical transmission systems. Carrier-to-noise ratio (CNR) is a useful measurement of the effects of noise upon signals. A goal of most high quality services delivery networks is to maintain the ratio of carrier signal level to noise as high as possible. The maintenance of a high CNR becomes more important as networks grow larger and implement two-way services.

Although employing simplistic techniques, such as decreasing the fiber lengths between optical nodes, can mitigate CNR problems, such techniques decrease the number of users served by the network, decrease the network's physical reach, decrease the value of the network to its users, and ultimately, increase costs to both subscribers and service providers. Thus, any solution to the problem of degradation of CNR in large system networks should offer a better way to provide reliable and accurate transmission of optical signals within a cable television system while maintaining or increasing all existing functionality.

DETAILED DESCRIPTION OF A PREFERRED EMBODIMENT

Figure 1:
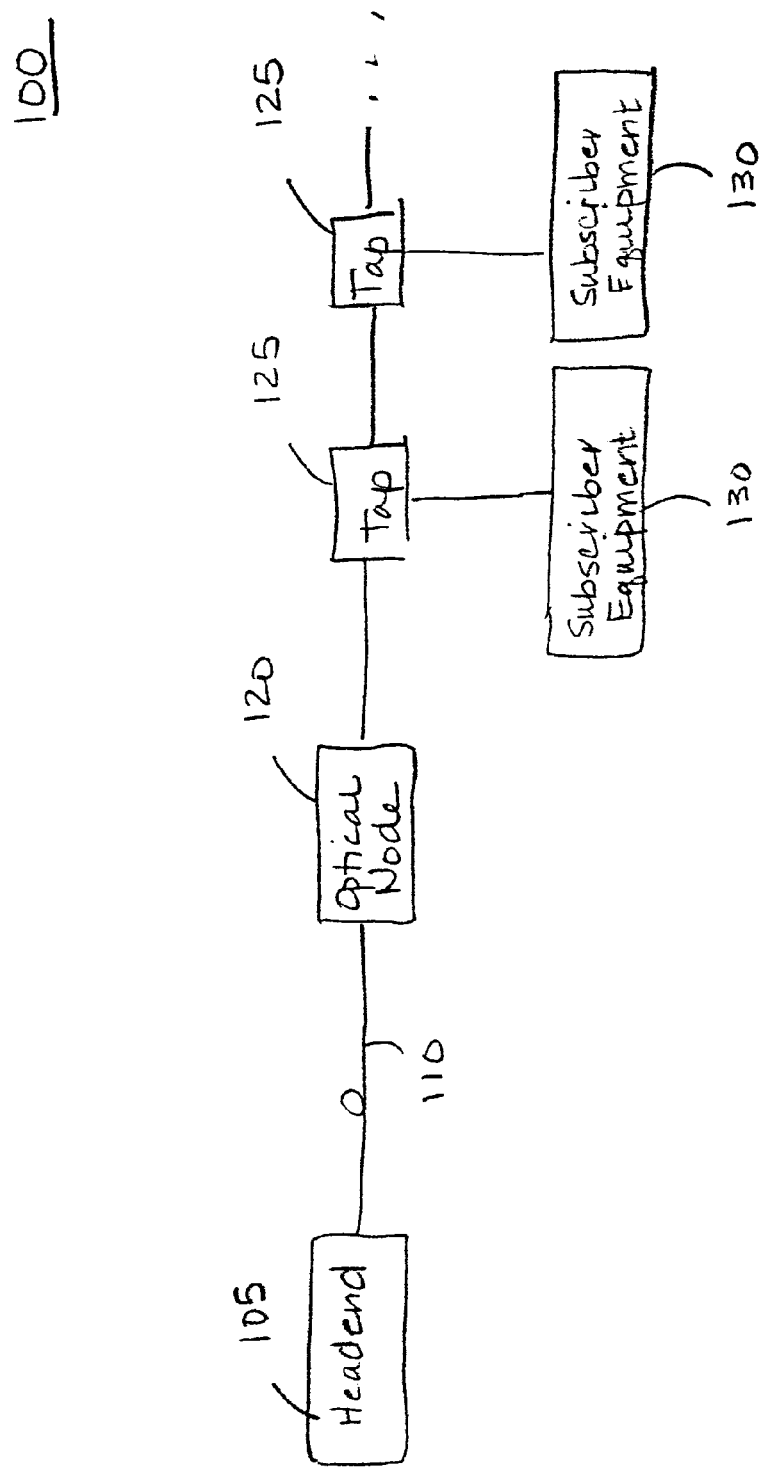
FIG. 1 is a block diagram of a broadband communication system, such as a cable television system.

FIG. 1 shows a communications system 100, such as a cable television system, having both forward and reverse paths, i.e., having the ability to communicate downstream in the forward direction and upstream in the reverse direction. The cable television system 100 includes a headend 105 for receiving satellite signals that are demodulated to baseband or an intermediate frequency (IF). The baseband signal is then converted to cable television signals that are routed throughout the system 100 to subscriber equipment 130, such as set top decoders, televisions, or computers, located in the residences or offices of system subscribers. The headend 105 can, for instance, convert the baseband signal to an optical signal that is transmitted over fiber optic cable 110, in which case a remotely located optical node 115 converts the optical signal to an electrical radio frequency (RF) signal for further transmission through the system 100 over coaxial cable 120. Taps 125 located along the cable 120 at various points in the distribution system split off portions of the RF signal for routing to subscriber equipment 130 coupled to subscriber drops provided at the taps 125.

The system 100, as mentioned, also has reverse transmission capability so that signals, such as data, video, or voice signals, generated by the subscriber equipment 130 can be provided back to the headend 105 for processing. The reverse signals travel through the taps 125 and any nodes 115 and other cable television equipment, e.g., reverse amplifiers, to the headend 105. In the configuration shown in FIG. 1, RF signals generated by the subscriber equipment 130 travel to the node 115, which converts the RF signals to optical signals for transmission over the fiber optic cable 110 to the headend 105.

Typically, included within the headend 105 are optical transmitters for transmitting optical signals through the fiber optic cable 110 to the optical node 120. The transmitters include a light source, e.g., a laser, which emits a light beam. As mentioned briefly in the Background of the Invention, it is a known problem that an optical receiver within the optical portion of the system may receive a signal from the transmitter with a larger than desired noise content, which adversely affects the carrier-to-noise (CNR) ratio by lowering it. Emanating from the transmitter, variations in the intensity of the optical source can be considered a noise type characterized by the square of the ratio of the noise's root-mean-square (RMS) intensity to that of the optical beam's RMS intensity. This type of noise, referred to as relative intensity noise (RIN) is distinctly attributable to the emitted signal and contributes to the overall system noise present at the receiver and the degradation of the transmission's CNR. This is in contrast to other noise sources such as shot, which is generated in the optical detection process itself, or thermal and RF noise, which are consequences of a non-absolute zero temperature and non-ideal RF amplification in the receiver.

The general relationship of RIN to that of any optical transmission system's overall CNR is described in the following relationship:

$$CNR = \frac{\frac{1}{2}m^2(R \cdot P_{OPT})^2}{RIN \cdot (R \cdot P_{OPT})^2 + 2q(R \cdot P_{OPT}) + i_{th}^2}.$$

Where,

CNR—Carrier to Noise Ratio in a 1 Hertz bandwidth, as measured at the receiver, which is unitless.

m—Modulation index, a measure of the optical transmitter's ability to amplitude modulate light, which is unitless.

R—Responsivity of the optical receiver, which is in Amperes (electrical)/Watt (optical) received.

$P_{OPT}$—Power (optical) received, which is measured in Watts.

RIN—Relative Intensity Noise, measured in Watts per Watt/Hz q—Quantity of charge on the electron, taken at $1.6022 \cdot 10^{-19}$ Coulombs.

$i_{th}^2$—Square of the receiver's RMS current noise, i.e. thermal noise, in amperes$^2$.

Thus, as can plainly be seen from the above, in order to maximize CNR, one may either increase $P_{OPT}$ which is the optical power presented to the receiver thus creating linearity problems to be solved in the receiver; increase m, which is the Optical Modulation Index thus creating linearity problems to be solved in the transmitter; reduce $i_{th}^2$, which is the receiver's mean-square current noise at increased expense to all receivers connected to a single transmitter; or reduce RIN, which is the residual amplitude fluctuations of an imperfect beam of laser light. To date, modifications to the value of RIN are difficult to achieve, requiring complex feedback schemes that are difficult to adjust, and additionally are frequency and phase sensitive.

Figure 2:
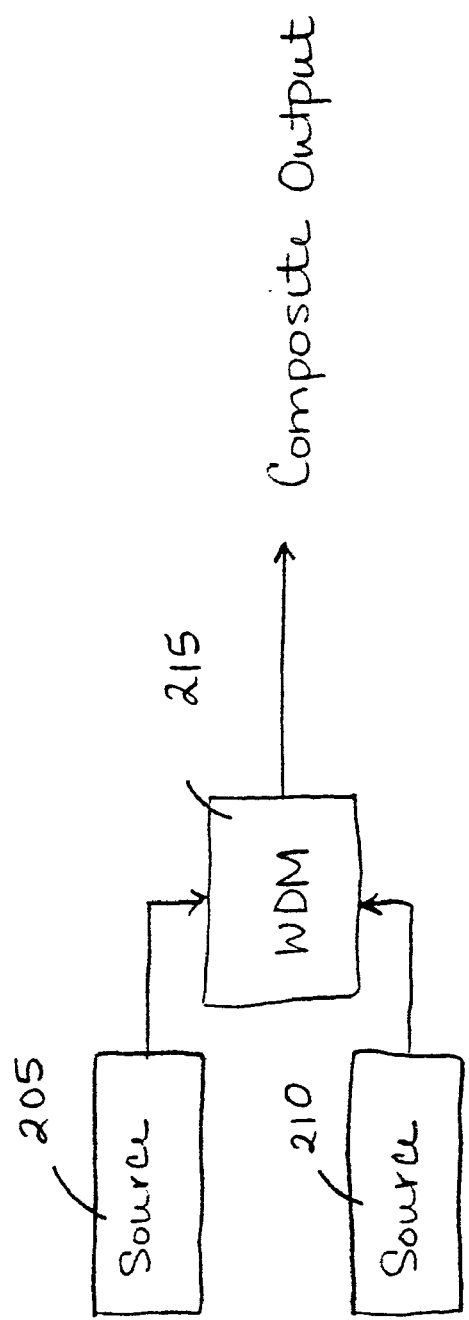
FIG. 2 is a block diagram of an optical link including a transmitter that suppresses the relative intensity noise (RIN) in accordance with the present invention.

Referring to FIG. 2, a transmitter 200 in accordance with the present invention is depicted. The transmitter 200 improves the optical transmission and increases the CNR by suppressing RIN at the receiver. It is important to note that no modifications or additional equipment are required at the optical receiver further downstream in order to achieve the suppression of RIN as measured at the receiver. More specifically, the suppression is strictly a result of the transmitter improvements disclosed herein. Any conventional optical receiver, such as the optical receivers used in a cable television optical system, in particular receivers already deployed in existing service, may receive the signal and benefit from the RIN improvements in the transmitted signal.

A transmitter 200, such as an optical transmitter, includes two sources 205, 210 each emitting signals of equal information content. In the first embodiment of the present invention, the two sources 205, 210 are independent and uncorrelated. Therefore, the noise that is emitted from the two sources 205, 210 is also independent and uncorrelated. Effectively, the two sources 205, 210 emit signals at different wavelengths. A combiner 215, such as a wavelength division multiplexer (WDM), effectively combines the two wavelengths for transmission over a common transmission medium, such as an optical fiber, and transmits the composite signal downstream through the communications system. It will be appreciated that FIG. 2 does not specifically apply to an optical or RF system, but rather, it applies generally to the principle of adding multiple sources together to reduce relative intensity noise (RIN), therefore decreasing the CNR in a communications system.

By way of example, a signal from a first source with a RIN of negative 156 decibels per Hertz (dB/Hz) at a particular input power, e.g., 1 milliWatt (mW), is added with an identical signal from a second source that also has a RIN of negative 156 dB. The power in both beams is adjusted, such as with optical attenuators, to maintain a total power of 1 mW. More specifically, each source is attenuated to ½mW so that the added power equals 1 mW. In accordance with the present invention, the RIN of the composite beam is negative 159 dB/Hz, which is effectively 3 dB lower than the RIN of either source taken by itself. It will also be appreciated that FIG. 2, which shows two sources 205, 210 for emitting signals, can, in accordance with the present invention, be altered to represent a transmitter 200 including more than two sources, for example, three, four, or ten sources. Notably, adding additional sources continues to lower the RIN of the composite signal. As mentioned, all sources include the same information with their powers adjusted and are of different wavelengths. The signals from all sources are then combined via the combiner 215. More specifically, introducing a third source and adjusting all powers such that each signal carries ⅓mW results in a negative 160.8 dB/Hz RIN for the composite signal. In general, following the techniques disclosed in the present invention, the RIN of a transmitter comprised of any number of sources, each of identical RIN, will be improved, and is discussed further below.

Figure 3:
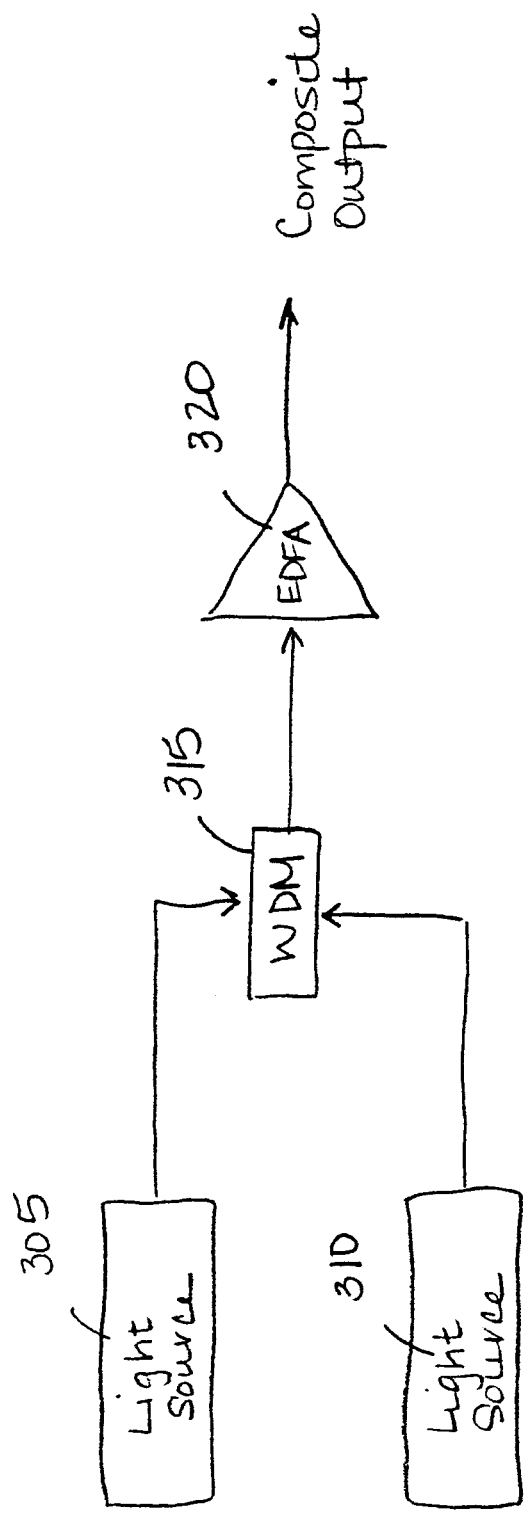
FIG. 3 is a block diagram of an optical link including an optical transmitter and an erbium-doped fiber amplifier (EDFA) that suppresses the RIN in accordance with the present invention.

FIG. 3 illustrates an optical transmitter 300 in accordance with a second embodiment of the present invention. Two light sources 305, 310 are shown each emitting substantially equal optical signals and each possessing a different wavelength. A combiner 315, such as a WDM, couples the two signals onto a single fiber, and the composite signal is provided to the input of an optical amplifier 320, such as an erbium-doped fiber amplifier (EDFA). The composite optical signal is then amplified by the EDFA. The optical signals are derived in the same manner as described above in relation to FIG. 2, i.e., the same RIN values, adjustment of powers, and different wavelengths, in which the composite signal results in a 3 dB reduction of RIN.

Figure 4:
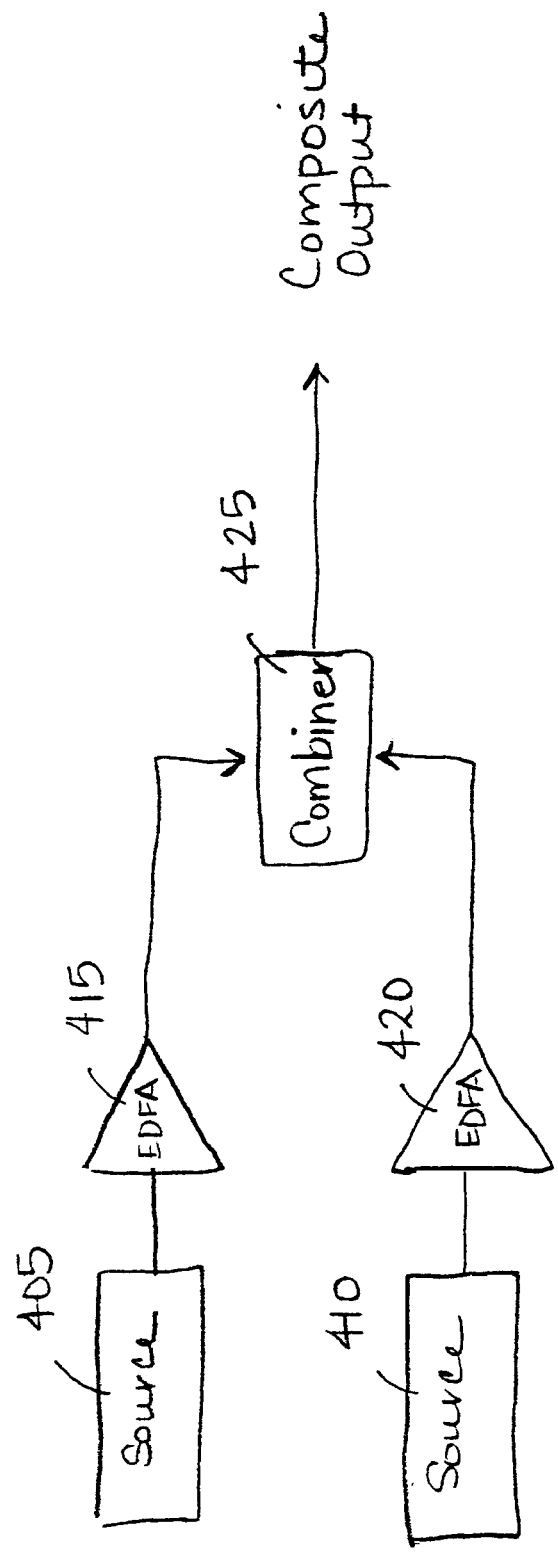
FIG. 4 is a block diagram of a second embodiment of an optical link including an optical transmitter and an EDFA that suppresses the RIN in accordance with the present invention.

FIG. 4 illustrates a further embodiment of the present invention. To reduce the composite RIN to 3 dB below that of a conventional transmitter, i.e., a single source driving the input of a single EDFA, FIG. 4 shows a transmitter including two sources 405, 410 each applied to an input of a single EDFA 415, 420. Thereafter, the amplified outputs are combined in a combiner 425, such as a dense wavelength division multiplexer (DWDM). Optical filters, as embedded sub-components of the DWDM itself, spectrally matched to the individual sources driving each EDFA, act to suppress the signal-spontaneous beat noise that can occur, i.e., noise as a result of amplified spontaneous emission (ASE), that falls under the wavelength of the second source's output. Thus, the use of a DWDM 425 in the present invention serves a dual role, that of a combiner and an optical spectrum filter.

Figure 5:
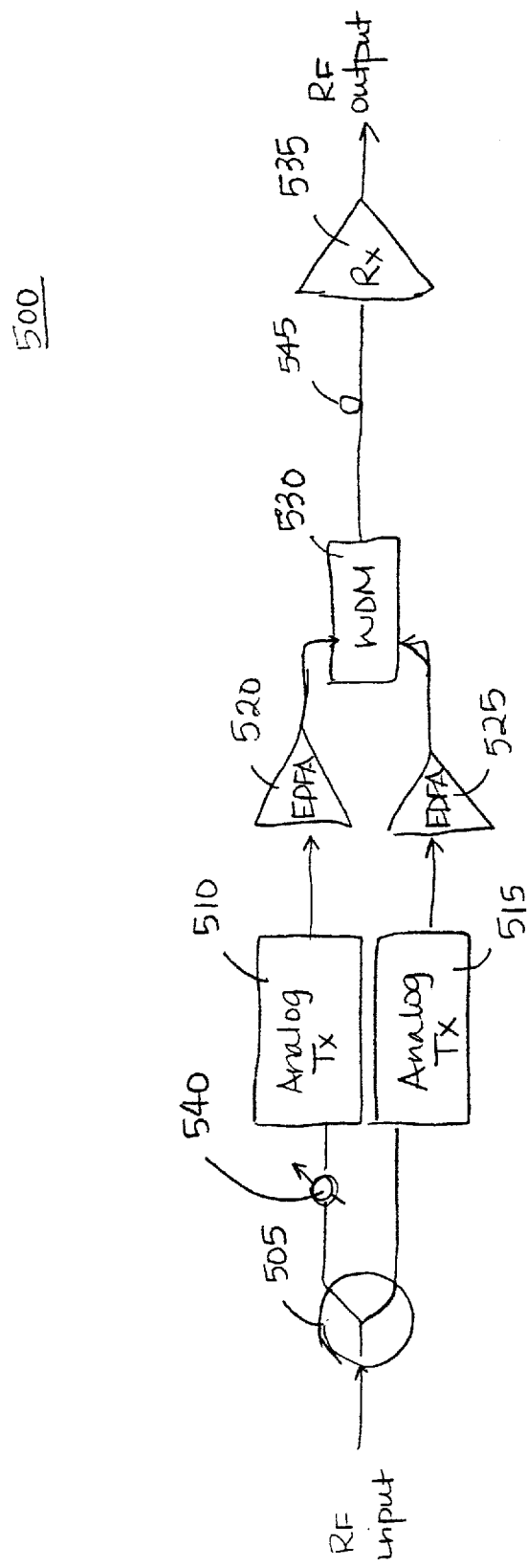
FIG. 5 is a block diagram of an analog cable television system link that suppresses the RIN, and subsequently, enhances the carrier-to-noise ratio in accordance with the present invention.

FIG. 5 shows a further embodiment in accordance with the present invention used within a communications system 500, such as a cable television system. An RF splitter 505 splits an RF input signal into two equal amplitude signals, or more specifically, provides a redundant RF signal. Two parallel optical transmitters 510, 515 each receives one of the equal RF signals, each modulates the respective signal, and then each transmits an optical signal, modulated to follow the input signal, to an input of an EDFA 520, 525. The amplified optical signals are then combined through an optical combiner 530, e.g., WDM, and transmitted through fiber optic cable to a receiver 535 further downstream. Advantageously, it is again important to note that the receiver 535 is one conventional optical receiver. Also, no additional multiplexers or combiners are required at the receiver end to achieve the benefits of a lowered RIN, in comparison to Piehler et al., U.S. Pat. No. 5,940,196. Piehier et al. discloses the teachings of which are incorporated herein by reference. It will also be appreciated that the transmitters 510, 515 can be transmitters, such as conventional optical transmitters, arranged in parallel to provide the benefit of a 3 dB reduction in RIN, or they can also be transmitters that include two light sources, in which the system 500 then provides the benefit of the reduction in RIN equal to four lasers, which results in a 6 dB reduction in RIN as shown in Table 1 further below.

The teachings of Piehler et al. include a technique in which received RF signals, not optical signals, are combined in the RF domain, not in the optical domain. To those skilled in the art, the principle upon which the disclosure of Piehler et al. operates to improve CNR, i.e., the coherent addition of RF signals is markedly different than that of the present invention. The coherent addition of two RF signals, each possessing identical frequency, phase, and amplitude, doubles the voltage of the signal, thereby quadrupling its power. The technique of Piehler et al. relies heavily on the incoherence of the two noise sources. If both sources of Piehler et al. are derived from the same transmitter or modulator, the noise component attributed to RIN is common to both signals and will also add coherently, resulting in significantly less than a 3 dB improvement in CNR.

In contrast, an advantage of the present invention is that transmission of the signal occurs entirely within the optical domain and employs incoherent optical combination of multiple differing wavelength sources by WDMs within the transmission apparatus, rather than coherent RF combination at the receiver, as in the prior art. Notably, the present invention requires no phase adjustment apparatus to be present in the optical receiver, such as described by Nazarathy et al., U.S. Pat. No. 5,253,309, the teachings of which are incorporated herein by reference. Furthermore, the reduction of RIN according to the present invention is accomplished at the transmitter using conventional optical equipment in both the transmitter and receiver; therefore as an advantageous consequence, the absence of additional equipment in the receiver end, which prior art CNR enhancement schemes require, does not inject additional noise, such as shot and thermal noise.

Referring again to FIG. 5, a phase delay 540 is shown and provided to correct for any time difference between the optical signals. The phase delay 540 may not be required in certain embodiments of the present invention due to the length, transmission characteristics, or quality of fiber 545 used between the transmitter and receiver. A phase delay 540, located, for example, within the transmitter or after the RF splitter 505, in accordance with the present invention, may be required to offset the time difference of one signal from another since the light propagates through the fiber at differing rates, dependent upon its wavelength and the composition of the optical fiber. In order to avoid the need for phase correction within the optical receiver, which could require additional equipment on the receiving end, the phase delay 540, depending upon the distance the wavelengths must travel, is accomplished by using software, hardware, or a combination of both.

Figure 6:
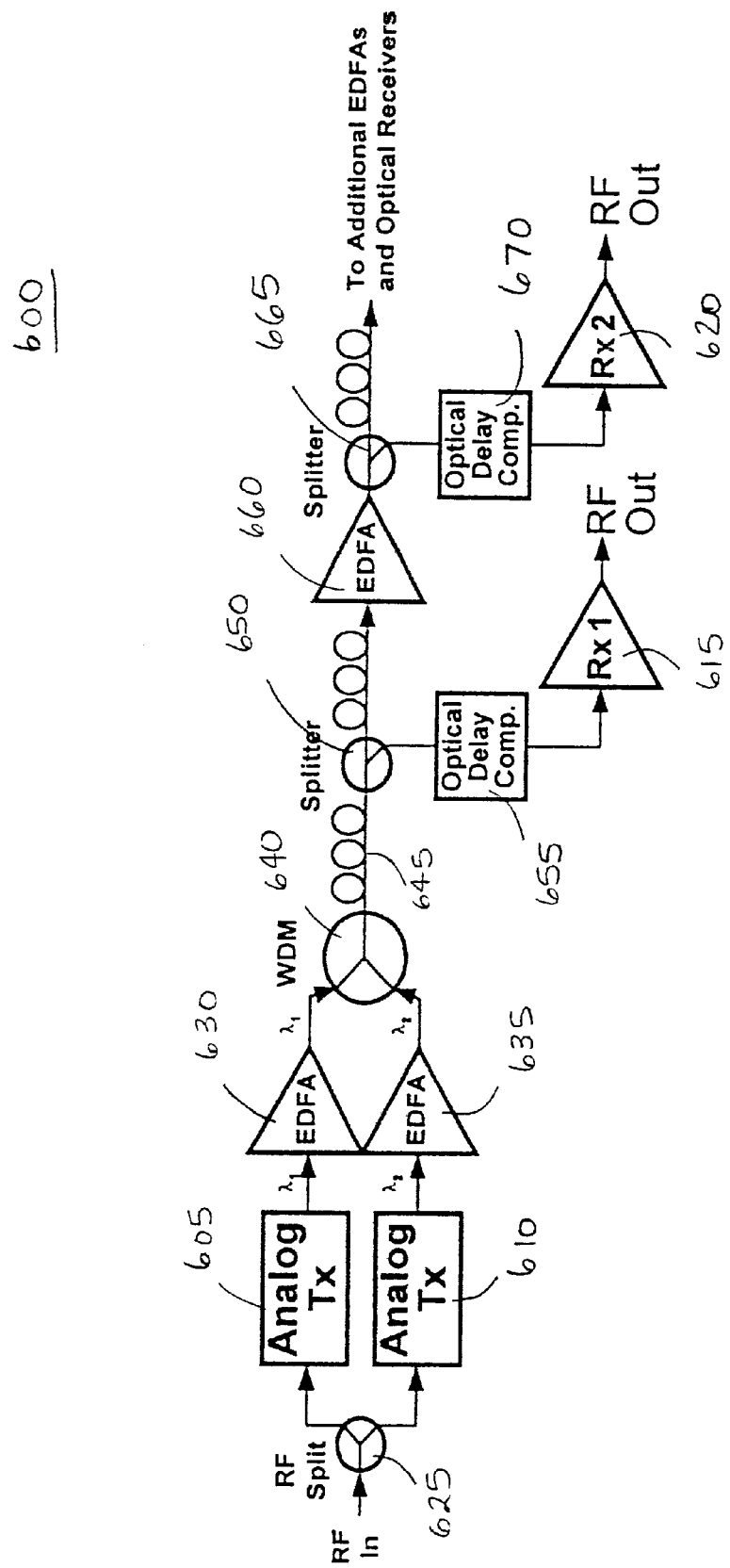
FIG. 6 is a block diagram of a further embodiment of a communications system, such as a cable television system, that suppresses the RIN in accordance with the present invention using multiple optical receivers.

FIG. 6 shows a block diagram of a further embodiment of a cable television system 600 that employs optical transmitters 605, 610 in accordance with the present invention and a plurality of optical receivers 615, 620. It will be appreciated that the embodiment of the present invention shown in FIG. 6, removes the requirement for either a fixed or variable phase delay 505 (FIG. 5) at the optical transmitter, and allows for independent phase correction at multiple optical receivers, such as receivers 615, 620, located at various and different distances from the transmitter.

An RF splitter 625, or redundancy circuit, receives an RF input signal and provides the substantially equal signals to each input of the parallel optical transmitters 605, 610. The transmitters 605, 610 each modulates the respective received signal and then each transmits the optical signal, modulated to follow the input signal, to an input of an amplifier 630, 635, such as an EDFA. The amplified optical signals are then combined through an optical combiner 640, for example, a WDM, and then the composite signal is transmitted through a communication medium 645, such as a fiber optic cable.

An optical splitter 650 installed along the communication medium 645 diverts a portion of the composite signal to an optical delay compensator 655 and the first optical receiver 615 within the system 600. The remaining portion of the composite signal continues further through the communication medium 645 where it is amplified through an amplifier 660, such as an EDFA. A second splitter 665 can be installed along the communication medium 645 that further diverts a portion of the composite signal, thereby allowing the remaining composite signal to further travel through the communication medium and to, for example, further amplifiers and optical receivers within the system. The diverted portion of the composite signal is provided to a second optical delay compensator 670 that is then provided to the second optical receiver 620.

The optical delay compensators 655, 670 are necessary, for example, if excessive delay exists between the two modulated RF signals due to varying times of flight in the communication medium 645 employed in the network. The optical delay compensator can, for example, be an all-fiber device, such as a Bragg grating written into the fiber of a birefringent bulk optic device coupled to the fiber optic cable 245. Advantageously, the optical receiver 615, 620 is one conventional optical receiver with no additional multiplexers or combiners required at the receiver end to achieve the benefits of a lowered RIN, in comparison to Piehler et al. Additionally, it will be appreciated that this embodiment as represented in FIG. 6, employs no RF delay elements, whereby the embodiment of the present invention achieves both RIN reduction and time-of-flight correction solely in the optical domain.

Further, the embodiment of the present invention represented in FIG. 6 can be extended to include more than two transmitters and two wavelengths by suitable design of the optical delay compensators 655, 670. It will be apparent to those skilled in the art that the design of an optical compensator, such as 655, 670, whose only function is to differentially delay certain wavelengths so that all wavelengths may arrive at the optical receiver 615, 620 at the same time is easier to design and implement than that of a multi-wavelength dispersion compensation element.

Additionally, the teachings of the present invention are not intended to limit the use within a single distribution network as shown in FIG. 6, but are equally applicable to other signal distribution arrangements, such as a star-node network, multiple splits and taps, or multiple receivers on a single tap.

Referring in general to the reduction of RIN and in accordance with the present invention, RIN is defined as the square of the total optical noise power as measured at an optical detector divided by the square of the total optical beam power per unit bandwidth. After derivation, and in general, the RIN of an optical signal composed of a plurality of N independent and uncorrelated sources possessing identical RIN and power, with no spectral overlap of noise sidebands, will be the RIN of an individual carrier minus 10 log(N). By way of example, if two sources are used, the RIN would be improved by 10 log (2) over that of a transmitter employing a single source. It will also be appreciated that the RIN can also be reduced if the sources are not identical, but are uncorrelated with no spectral overlap of noise sidebands.

Figure 7:
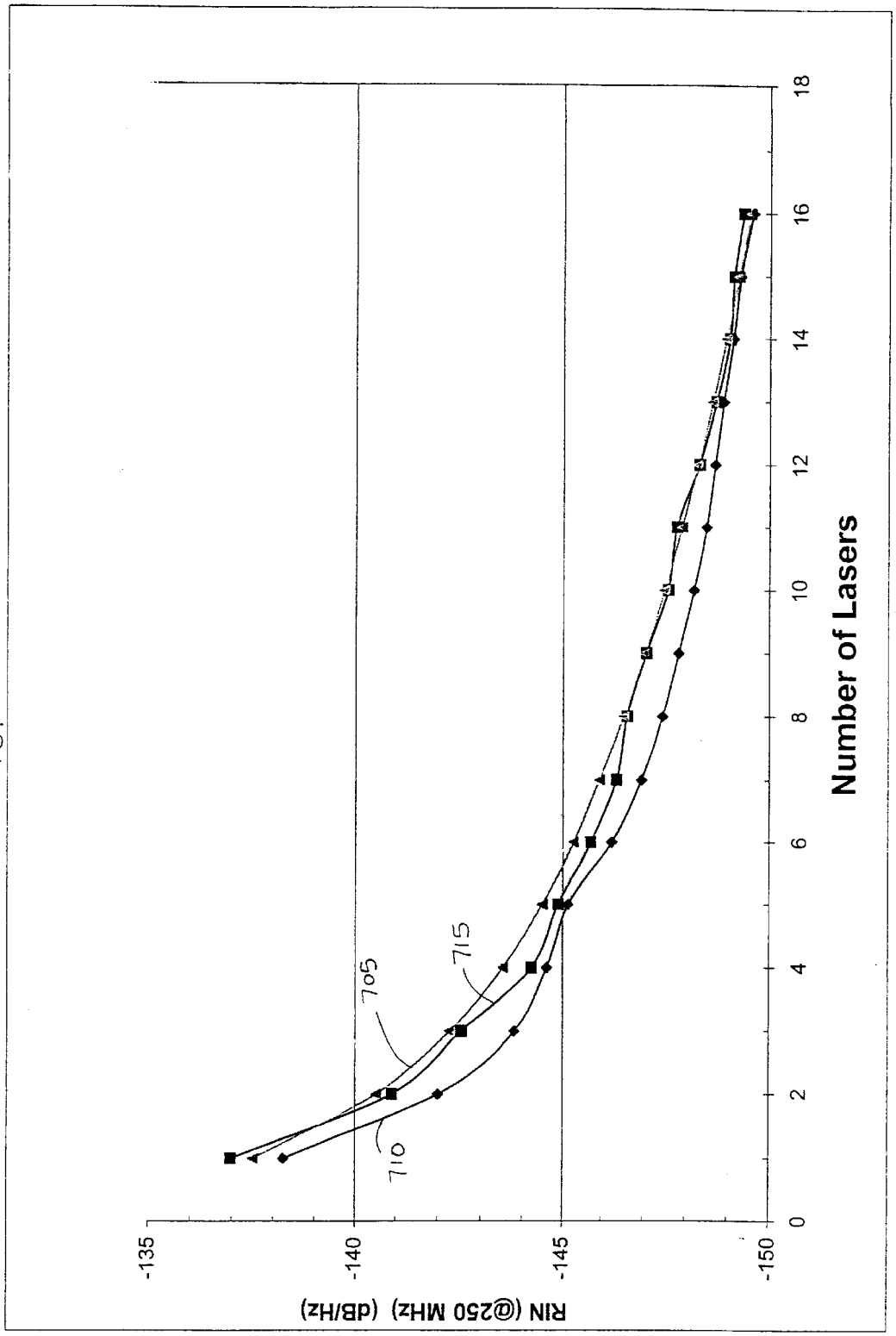
FIG. 7 illustrates a graph of RIN reduction versus the number of lasers employed within a transmitter in accordance with the present invention.

FIG. 7 displays a graph of RIN reduction versus the number of lasers used in a transmitter.

The graph is based on three different measurements: a calculated measurement 705; a first measurement 710; and a second measurement 715, where the first and second measurements are test results. As can be seen, use of a single laser produces a RIN value of negative 137.5 dB/Hz. When a second laser is combined with the first laser as presented in the above embodiments of the present invention, a total reduction of 3 dB is accomplished with a RIN value of negative 140.5 dB/Hz. The next value referenced with three lasers drops the RIN value to negative 142.2 dB, or a total decrease of 4.7 dB. Compared to the 3 dB as seen with the addition of just one laser, each additional source incrementally increases the RIN reduction but to a lesser degree. More specifically, it will be appreciated from referencing FIG. 7, the difference between one laser and two lasers is the largest decrease in RIN value, but the RIN value continues to decrease as additional lasers are used to generate a composite signal, as shown in the following table and based on the calculated measurements 705.

TABLE I

| RIN (dB/Hz) | Number of Lasers | Calculated Measurement showing a Reduction in RIN (dB) | First Measurement showing a Reduction in RIN (dB) |
| --- | --- | --- | --- |
| −137.5 | 1 | 0.00 | 0.0 |
| −140.5 | 2 | 3.01 | 3.0 |
| −142.2 | 3 | 4.77 | 4.7 |
| −143.5 | 4 | 6.02 | 6.0 |
| −144.5 | 5 | 6.99 | 7.0 |
| −145.3 | 6 | 7.78 | 7.8 |
| −146.0 | 7 | 8.45 | 8.5 |
| −146.5 | 8 | 9.03 | 9.0 |
| −147.0 | 9 | 9.54 | 9.5 |
| −147.2 | 10 | 10.00 | 9.7 |
| −147.4 | 11 | 10.41 | 9.9 |
| −148.0 | 12 | 10.79 | 10.5 |
| −148.3 | 13 | 11.14 | 10.8 |
| −148.4 | 14 | 11.46 | 10.9 |
| −149.0 | 15 | 11.76 | 11.5 |
| −149.1 | 16 | 12.04 | 11.6 |

It will be appreciated to one skilled in the art that the noise parameters of CNR and RIN are now fully understood and applicable in transmitter applications, e.g., optical transmitters. Advantageously, in accordance with the present invention, an operator may deploy a transmitter comprised of multiple signal sources, while maintaining currently deployed or conventional receivers, and improve the carrier-to-noise by suppressing RIN by at least 3 dB, depending upon the number of signal sources employed.

What is claimed is:

1. A method in a transmitter for suppressing relative intensity noise (RIN), the method comprising the steps of:

generating a first signal having a power value and a first wavelength;

generating a second signal having a power value and a second wavelength;

adjusting the power value of the first signal and the power value of the second signal;

combining the first and second signals into a single output signal, wherein the single output signal has an output power value equal to the sum of the adjusted power value of the first signal and the adjusted power value of the second signal; and transmitting the single output signal over a communication medium, wherein information content of the first and second signals is substantially equivalent; and wherein combining the first and second signals before transmitting provides a reduction in RIN of the single output signal.

2. The method of claim 1, further comprising, subsequent to adjusting the power values of the first and second signals, the step of:

delaying the second signal prior to the combining step.

3. The method of claim 1, further comprising, subsequent to combining the first and second signals into the single output signal, the step of:

amplifying the single output signal for transmitting to a receiver.

4. An optical transmitter for transmitting signals that include information, the optical transmitter comprising:

at least two optical sources for generating optical signals each having a substantially equal power value and each having a different wavelength;

a phase delay element coupled to an output port of at least one of the optical sources, wherein the phase delay element delays at least one of the optical signals a combiner for combining the optical signals into a composite signal, wherein the composite signal has an output power value equal to the sum of the power values associated with the optical signals; and an output coupled to the combiner for transmitting the composite signal, wherein transmission of the composite signal provides a reduction in relative intensity noise.

5. The transmitter of claim 4, further comprising:

an amplifier coupled to the combiner for amplifying the composite signal for further transmission.

6. A communications system for transmitting information, the communications system comprising:

an optical transmitter, comprising:

at least two optical sources for generating optical signals each having a substantially equal power value and each having a different wavelength;

a phase delay element coupled to an output port of at least one of the optical sources, wherein the phase delay element delays at least one of the optical signals;

a combiner for combining the optical signals into a composite signal, wherein the composite signal has an output power value equal to the sum of the power values associated with the optical signals;

a modulator for modulating the composite signal; and an output port coupled to the modulator for transmitting the composite signal along a transmission medium; and an optical receiver coupled to the optical transmitter for receiving the composite signal, wherein the composite signal provides a reduction in relative intensity noise of at least 3 dB.

7. The communications system of claim 6, further comprising:

an amplifier coupled to the modulator for amplifying the composite signal.

8. A method of measuring relative intensity noise (RIN), the method comprising the steps of:

generating at least two optical signals, each having a substantially equal power value and each having a different wavelength;

combining the optical signals into a composite signal, wherein the composite signal has an output power value equal to the sum of the power values associated with the optical signals; and measuring a level of the composite signal, such measurement associated with a value of RIN, and wherein the value of RIN is indicative of a reduction substantially equal to ten times logarithm of the number of optical signals.

9. A method in an optical transmitter for suppressing relative intensity noise (RIN), the method comprising the steps of:

receiving an input RF signal;

splitting the input RF signal into at least two RF signals having substantially equal information content;

generating at least two optical signals each having a power value and differing wavelengths, the at least two optical signals each associated with one of the at least two RF signals; and combining the at least two optical signals into a composite signal, wherein the composite signal has an output power value equal to the sum of the power value of the at least two optical signals, wherein the composite signal provides a reduction in RIN as compared to the RIN if a single one of the optical signals, at a greater power, such as two times the power if two optical signals are provided, had been transmitted by itself.

10. The method of claim 9, further comprising, prior to combining the at least two optical signals, the step of:

adjusting the power values of the at least two optical signals, wherein the output power value is equal to a desired output power value.

11. The method of claim 10, further comprising, subsequent to adjusting the power values of the at least two optical signals, the step of:

delaying at least one of the optical signals.

12. The method of claim 9, further comprising, subsequent to the combining step, the step of:

amplifying the composite signal for transmitting to a receiver.

13. A communications system for transmitting information, the communications system comprising:

an optical transmitter, comprising:

at least two optical sources for generating optical signals each having a substantially equal power value and each having a different wavelength;

a combiner for combining the optical signals into a composite signal, wherein the composite signal has an output power value equal to the sum of the power values associated with the optical signals;

a modulator for modulating the composite signal; and an output port coupled to the modulator for transmitting the composite signal along a transmission medium; and a splitter for splitting the composite signal into a first and second signal; and two receivers coupled to the splitter each for receiving respectively the first and second signal of the composite signal, wherein the first and second signal each provides a reduction in relative intensity noise of at least 3 dB.

14. The communications system of claim 13, further comprising:

an amplifier coupled to one output of the splitter for amplifying the second signal.

* * * * *